US012597809B1

(12) United States Patent     (10) Patent No.:   US 12,597,809 B1

Walker, Jr.     (45) Date of Patent:    Apr. 7, 2026

---

(54) METHOD AND APPARATUS FOR WIRELESS MOBILE DEVICE CHARGING FOR A WIRELESS MOBILE DEVICE WITH NO CHARGING PORTS

(71) Applicant: Michael G. Walker, Jr., San Jose, CA (US)

(72) Inventor: Michael G. Walker, Jr., San Jose, CA (US)

( * ) Notice: Subject to any disclaimer, the term of this patent is extended or adjusted under 35 U.S.C. 154(b) by 746 days.

(21) Appl. No.: 17/900,777

(22) Filed: Aug. 31, 2022

Related U.S. Application Data

(60) Provisional application No. 63/239,701, filed on Sep. 1, 2021.

(51) Int. Cl.
| | |
|---|---|
| *H01M 10/46* | (2006.01) |
| *H02J 7/50* | (2026.01) |
| *H02J 7/70* | (2026.01) |
| *H02J 50/40* | (2016.01) |
| *H02J 50/90* | (2016.01) |
| *H02J 50/10* | (2016.01) |

(52) U.S. Cl.
CPC ............... *H02J 50/40* (2016.02); *H02J 7/50* (2026.01); *H02J 7/731* (2026.01); *H02J 50/90* (2016.02); *H02J 50/10* (2016.02)

(58) Field of Classification Search
CPC .......... H02J 50/005; H02J 50/10; H02J 50/40; H02J 50/90; H02J 7/0044; H02J 7/0042; H02J 7/0013; H02J 7/731; H02J 7/50
USPC ................. 320/103, 107, 108, 114, 115, 116
See application file for complete search history.

(56) References Cited

U.S. PATENT DOCUMENTS

| | | | | |
|---|---|---|---|---|
| 9,667,092 | B2 * | 5/2017 | Miller ..................... | H02J 50/10 |
| 2018/0054078 | A1 * | 2/2018 | Wan ...................... | H02J 7/0042 |
| 2018/0115184 | A1 * | 4/2018 | Lee .......................... | H02J 50/10 |
| 2021/0265861 | A1 * | 8/2021 | Moussaoui ............. | H02J 50/12 |

FOREIGN PATENT DOCUMENTS

JP       2020114169 A   *   7/2020  ............ H02J 50/502

* cited by examiner

*Primary Examiner* — Edward Tso

(74) *Attorney, Agent, or Firm* — Nolte Lackenbach Siegel

(57) ABSTRACT

A battery powered wireless power transmitter may be used to charge a mobile device using wireless power. Such a wireless mobile device charger may include: a housing omitting any electronic ports or electrical contacts; a rechargeable battery disposed within the housing; an electronic power receiver disposed within the housing, the power receiver powered by an external source and through which the battery is wirelessly charged; and an electronic power transmitter disposed within the housing, the power transmitter powered by the battery to wirelessly transmit electrical power.

24 Claims, 7 Drawing Sheets

METHOD AND APPARATUS FOR WIRELESS MOBILE DEVICE CHARGING FOR A WIRELESS MOBILE DEVICE WITH NO CHARGING PORTS

CROSS-REFERENCE TO RELATED APPLICATIONS

The present application claims priority to and the benefit of U.S. Provisional Patent. Application Ser. No. 63/239,701, which was filed on Sep. 1, 2021. The aforementioned provisional application is hereby incorporated by reference for all purposes, including the right of priority, and in its entirety as if set forth herein verbatim.

STATEMENT REGARDING FEDERALLY SPONSORED RESEARCH OR DEVELOPMENT

Not applicable.

BACKGROUND

This section of this document introduces information about and/or from the art that may provide context for or be related to the subject matter described herein and/or claimed below. It provides background information to facilitate a better understanding of the various aspects of the present invention. This is a discussion of "related" art. That such art is related in no way implies that it is also "prior" art. The related art may or may not be prior art. The discussion in this section of this document is to be read in this light, and not as admissions of prior art.

The use and presence of mobile devices such as smart phones, tablets, laptops, etc. in society grows daily. These mobile devices need to be electrically charged periodically. Charging is frequently done using wall chargers that plug into an electrical socket that delivers power from the electricity grid. However, such electrical sockets are not always convenient when the need to charge a mobile device arises. Also, for convenience it may be desirable to not "plug" the charger into a wall socket (or the device to the charger).

SUMMARY

In various embodiments, a wireless mobile device charger includes a battery powered wireless electronic power transmitter by which one may wirelessly charge a mobile device using wireless power. Such a wireless mobile device charger may comprise: a housing omitting any electronic ports or electrical contacts; a rechargeable battery disposed within the housing; an electronic power receiver disposed within the housing, the electronic power receiver powered by an external source and through which the battery is wirelessly charged; and an electronic power transmitter disposed within the housing, the electronic power transmitter powered by the battery to wirelessly transmit electrical power.

In other embodiments, a mobile device may be charged using the wireless mobile device charger described immediately above. The mobile device may be placed on a top surface of the wireless mobile device charger whereupon power is wirelessly transmitted from the battery of the wireless charger to the mobile device using the power transmitter.

In still other embodiments, an assembly comprises an electrical charging base and a plurality of wireless mobile device chargers stacked atop the electrical charging base. The bottom-most wireless device charger is wirelessly charged by the electrical charging base. Each succeeding wireless device charger is wirelessly charged by the wireless device charger immediately below.

In yet other embodiments, a method for electrically charging a plurality of wireless mobile device chargers comprises stacking a plurality of wireless mobile device chargers on an electrical charging base; electrically charging the bottom-most wireless mobile device charger from the electrical charging base; and electrically charging each succeeding wireless device charger by the wireless device charger immediately below.

The above paragraphs present a simplified summary of the presently disclosed subject matter in order to provide a basic understanding of some aspects thereof. The summary is not an exhaustive overview, nor is it intended to identify key or critical elements to delineate the scope of the subject matter claimed below. Its sole purpose is to present some concepts in a simplified form as a prelude to the more detailed description set forth below.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the subject matter claimed below will now be disclosed. In the interest of clarity, not all features of an actual implementation are described for every example in this specification. It will be appreciated that in the development of any such actual implementation, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Furthermore, the phrase "capable of" as used herein is a recognition of the fact that some functions described for the various parts of the disclosed apparatus are performed only when the apparatus is powered and/or in operation. Those in the art, having the benefit of this disclosure, will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them—i.e., when there is no power or when they are powered but not in operation.

Figure 1:
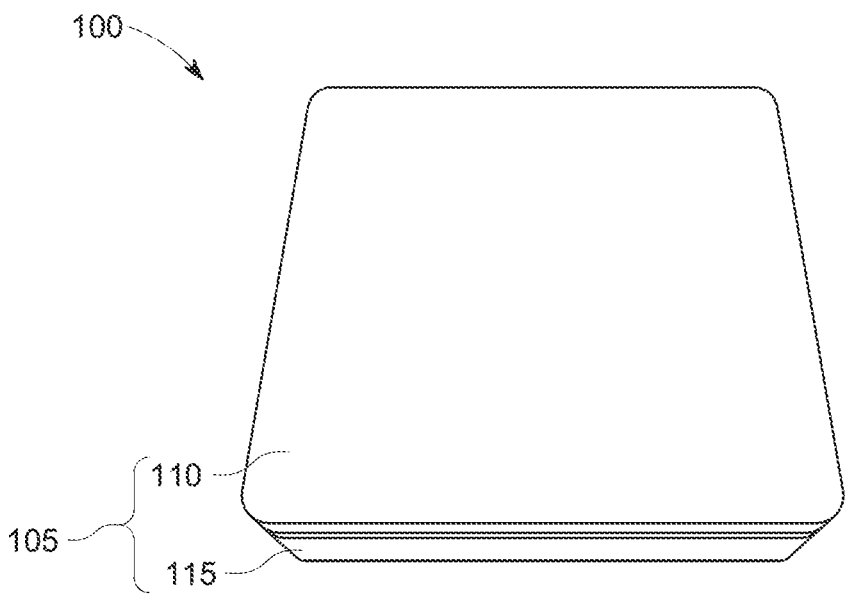
FIG. 1-FIG. 2 are assembled, perspective views of a wireless mobile device charger in one particular embodiment.
Figure 2:
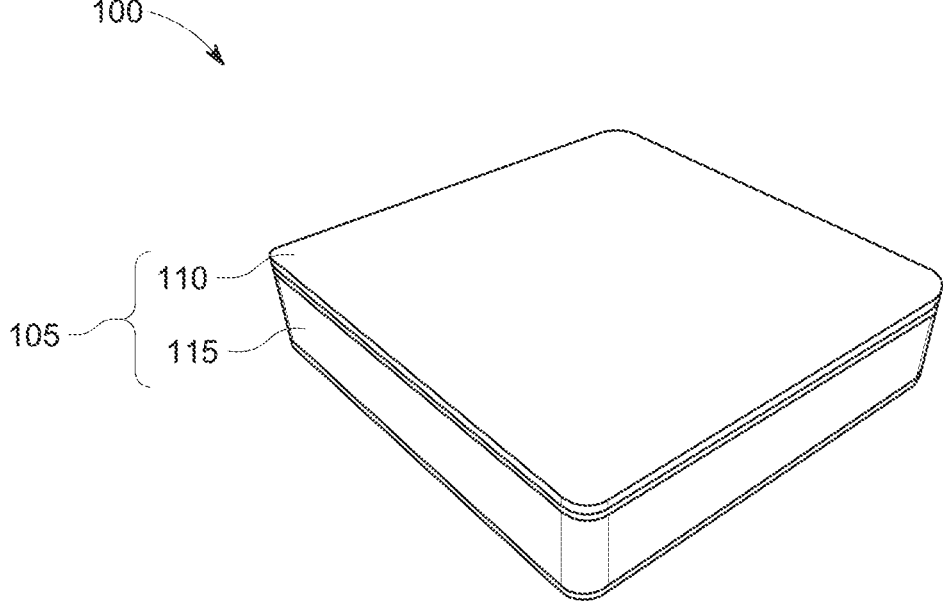

FIG. 1-FIG. 2 are assembled, perspective views of a wireless mobile device charger 100 in one particular embodiment. As used herein, the term "wireless" in the phrase "wireless mobile device charger" modifies the word "charger" rather than the term "mobile device". While it may be a given mobile device, that is charged using the wireless mobile device charger, may be wireless, this is immaterial to the practice of that which is claimed below. The mobile device may be wired or wireless. It is the "charger" that is "wireless" in the phrase "wireless mobile device charger" and that "wireless charger" is used to charge a "mobile device".

Referring to FIG. 1-FIG. 2 collectively, more particularly, the housing 105 of the wireless mobile device charger 100. The housing 105 omits, or does not have, any electronic ports or electrical contact points on the exterior thereof. Thus, this particular embodiment may not be charged using a wired connection to a wall or other power outlet.

The housing 105 comprises a top 110 and a bottom 115. The terms "top" and "bottom" as used herein are referenced to the normal and intended orientation of the apparatus when in use relative to the force of gravity. Thus, the "top" of the apparatus is portion of the apparatus most distal from the earth's surface and the "bottom" is the portion most proximal to the earth's surface.

The top 110 is fabricated from wood, white oak in this instance. Note that the aesthetic, or ornamental, appearance of the top 110 may be affected by the choice of woods as different woods have different grains. The bottom is fabricated from cast aluminum that that has been blead blasted and anodized. Note that alternative embodiments may use alternative materials, such as plastics, resins, etc. However, any metals that might be used should be limited to non-ferromagnetic metals to avoid interfering with the operation of the wireless mobile device charger as described further below. Similarly, any resins, plastics, etc. that may be used in alternative embodiments should not be electrically conductive.

Figure 3:
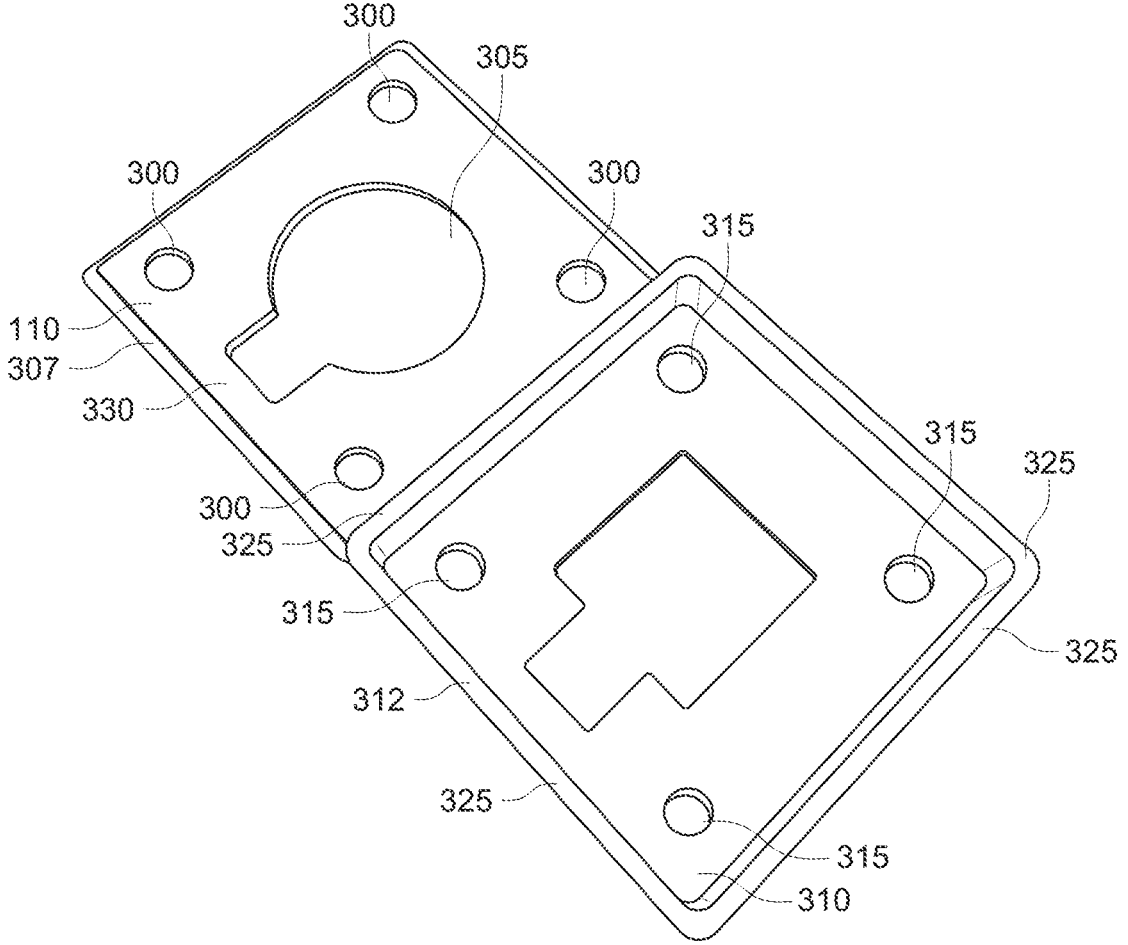
FIG. 3 is a disassembled, perspective view of the interior of the housing of the wireless mobile device charger of FIG. 1-FIG. 2.

FIG. 3 is a disassembled, perspective view of the interior of the housing of the wireless mobile device charger of FIG. 1-FIG. 2. The top 110 has been removed and flipped over for this view of its interior surface that defines four pockets 300 and a recess 305, each of whose function will be described further below. An insert 310 disposed on the bottom side of the bottom 115 defines four pockets 315, positioned to correspond to the pockets 300, and a recess 320, each of whose function will also be described further below.

The top 110 also defines a flange 307 to mate with the lip 312 of the bottom 115 when the top 110 is mated to the bottom 115 as shown in FIG. 1-FIG. 2. The bottom 115 includes, in this particular embodiment, four walls 325 that define a depth to the interior of the bottom 115. Upon assembly, the top 110 is mated to the bottom 115 and the main body 330 of the top 110 settles into the bottom 115 to a depth determined by the thickness of the top 110 less the thickness of the flange 307 that mates with the lip 312. When the top 110 mates with the bottom 115, they define an interior cavity in which other components of the wireless mobile device charger may be disposed as discussed further below.

The top 110 may be secured to the bottom 115 in some embodiments using a snap fit or a friction fit. Other embodiments may secure the top 110 to the bottom 115 by gluing, bonding, welding, brazing, etc. depending on the materials of the top 110 and the bottom 115. In other embodiments, fasteners such as screws (not shown) may be used to fasten the top 110 to the bottom 115. Still other embodiment may use other approaches.

Furthermore, the embodiment of FIG. 1 to FIG. 3, the housing 104 has a square external geometry. Other embodiments may employ other geometries, such as a circular or other geometry. Similarly, the walls 325 of the bottom 115 define a square interior geometry where other embodiments may employ a different interior geometry. Some embodiments may even employ interior geometries that differ from the exterior geometry. Still further, depending on the manner in which the top 110 is secured to the bottom 115, some embodiments may employ different external and/or internal geometries for the top 110 and the bottom 115.

Figure 4:
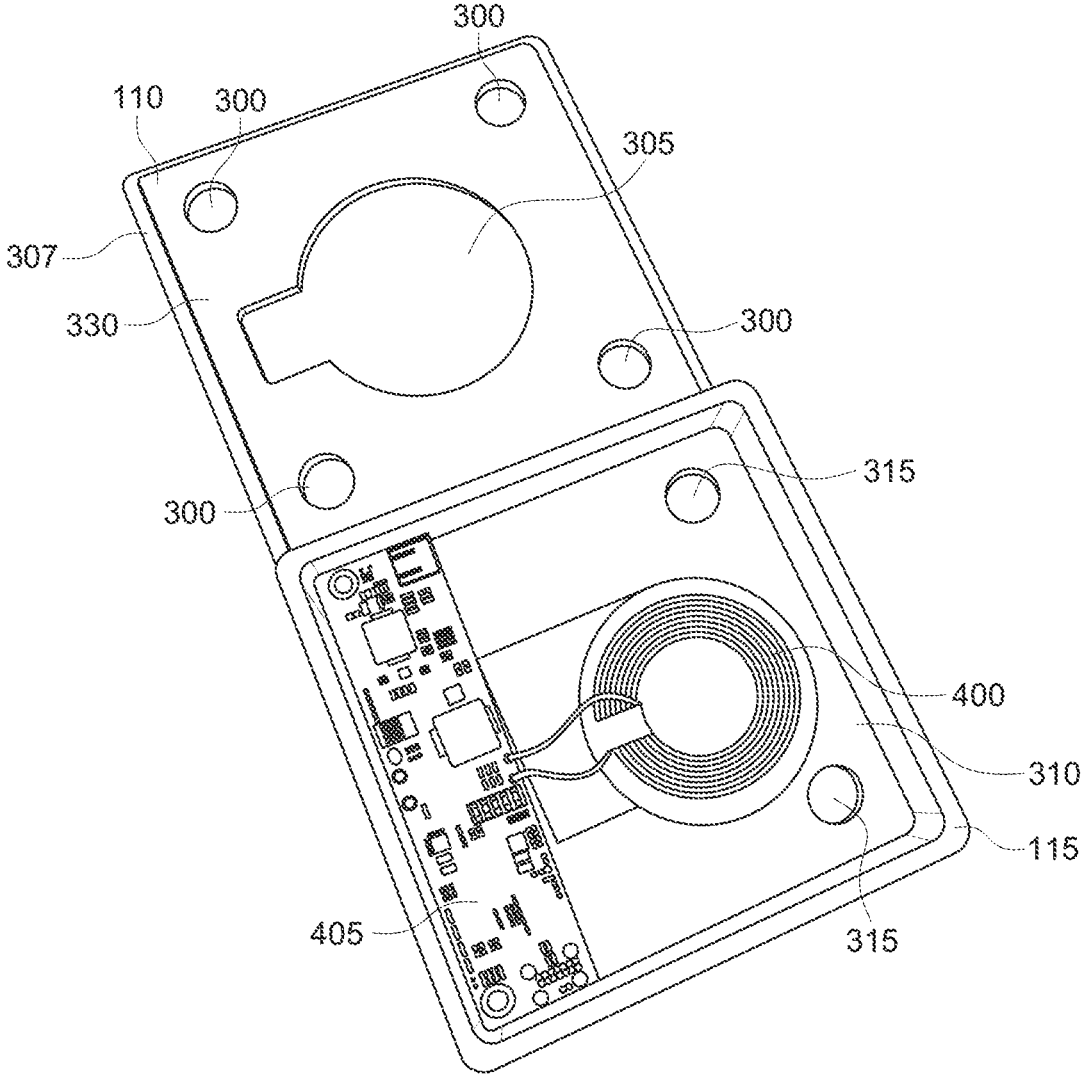
FIG. 4 is a disassembled, perspective view of the interior of the housing of the wireless mobile device charger of FIG. 1-FIG. 2 showing an electronic power receiver and a printed circuit board ("PCB") mounted within in one particular embodiment.

FIG. 4 is a disassembled, perspective view of the wireless mobile device charger 100 of FIG. 1-FIG. 2 showing an electronic power receiver 400 and a printed circuit board ("PCB") 405 disposed within the interior thereof. The recesses 305, 320 shown in FIG. 3 are positioned and designed for the electronic power transmitter (not yet shown) and the electronic power receiver 400 to be disposed therein. FIG. 4, more particularly, shows the electronic power receiver 400 disposed in the recess 320 of the insert 310, the recess 320 being obscured in FIG. 4 by the electronic power receiver 400.

The insert 310 may be affixed to the bottom 110 and the electronic power receiver 400 and PCB 405 may be affixed to the insert 310 in any suitable manner. For example, the PCB 405 may be fastened to the insert 310 using screws (not shown) and the electronic power receiver 400 may be epoxied to the insert 310 in the recess 320. The electronic power transmitter (not yet shown) may similarly be epoxied to the top 105 in the recess 305. Note that, in embodiments not shown, the features of the insert 310 may be cast or otherwise fabricated in the bottom 110 so that the insert 310 and the bottom 110 may be formed of a single, unitary piece.

Figure 5:
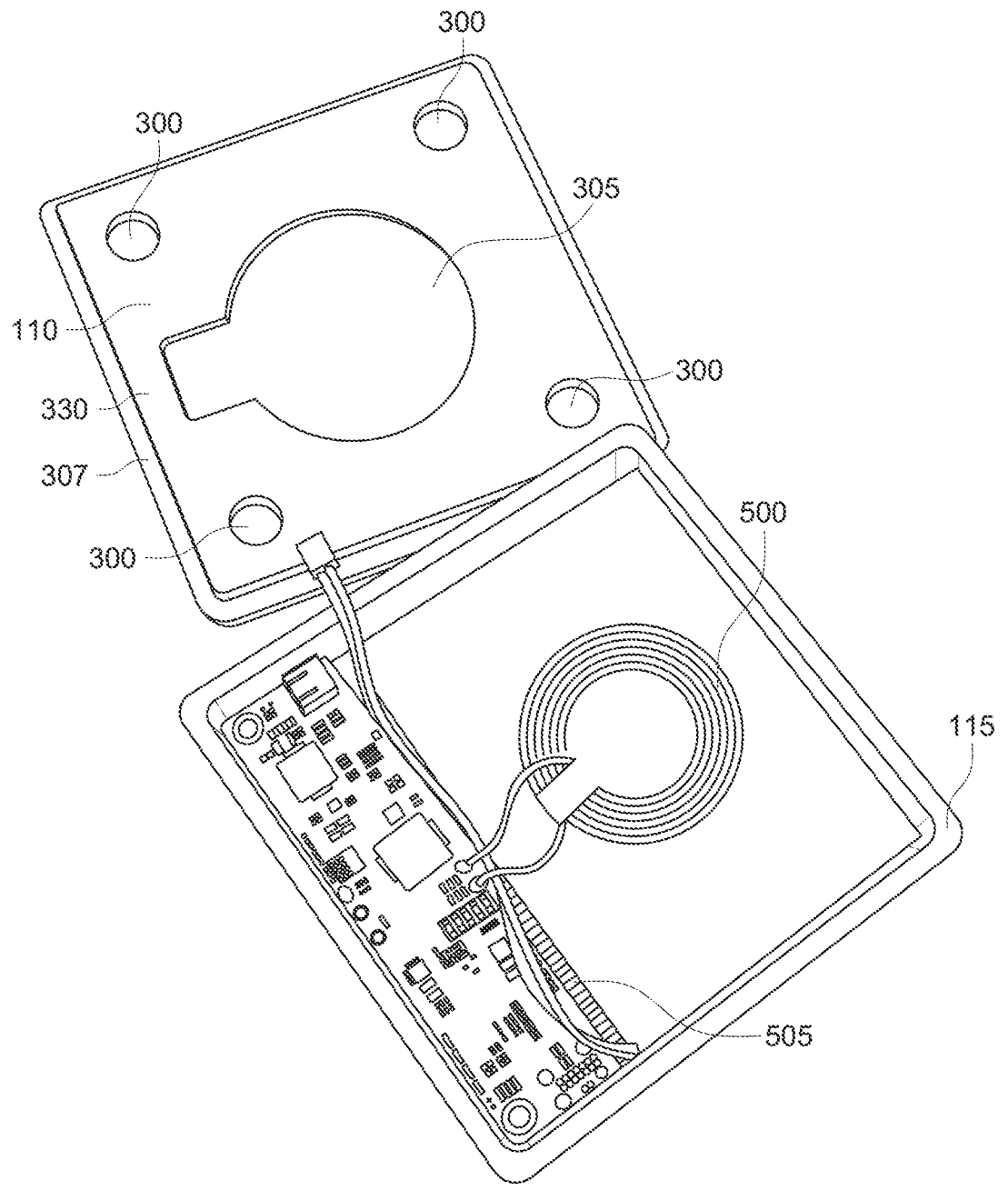
FIG. 5 is a disassembled, perspective view of the interior of the housing of the wireless mobile device charger of FIG. 1-FIG. 2 showing an electronic power receiver and PCB mounted within in another particular embodiment.

FIG. 5 is a disassembled, perspective view of the interior of the housing of the wireless mobile device charger of FIG. 1-FIG. 2 showing an electronic power transmitter 500 and PCB 505 mounted within in another particular embodiment. FIG. 5 also shows the battery 510, that is discussed further below.

Figure 6:
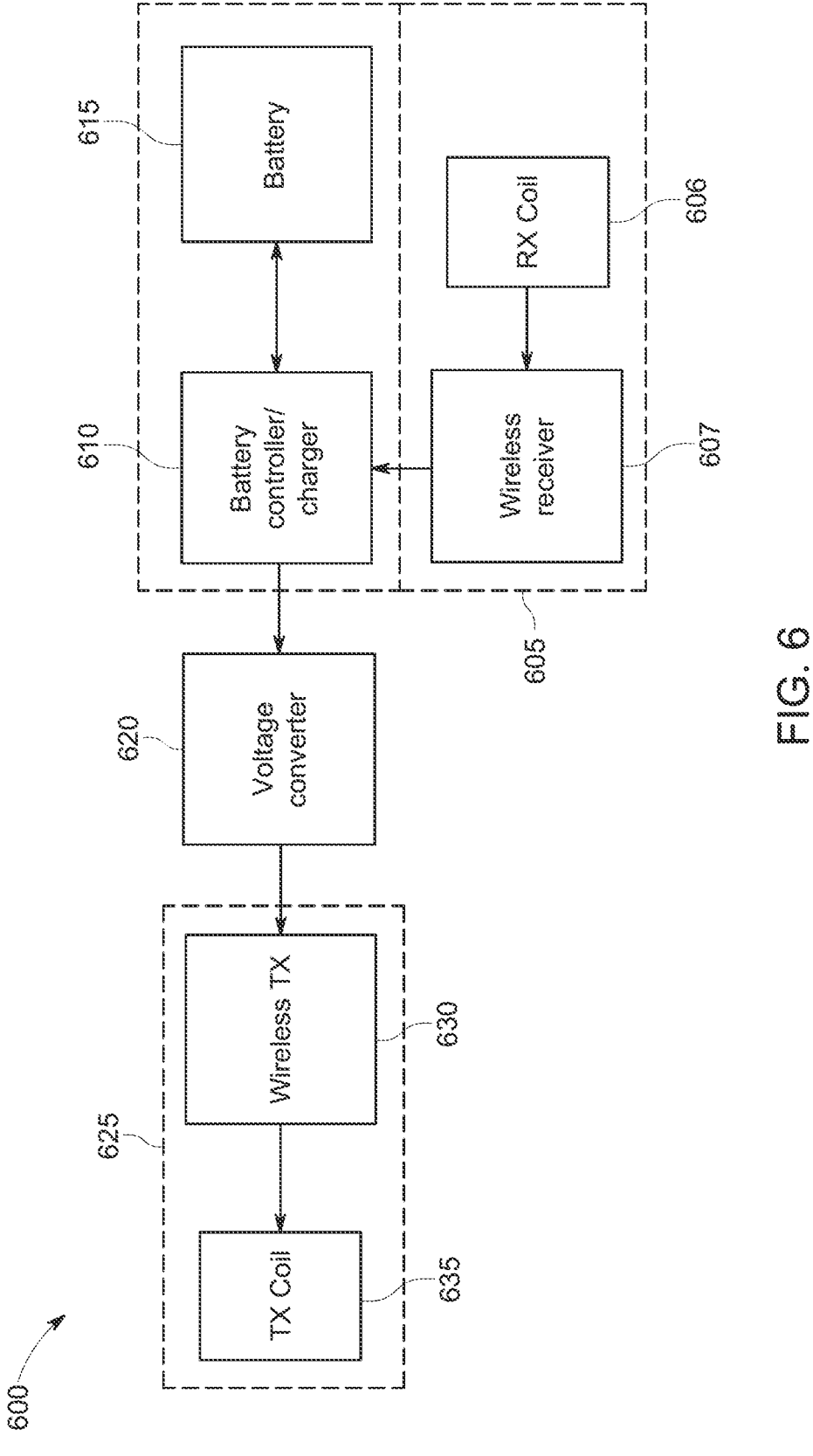
FIG. 6 is a block diagram of selected portions of an electronic circuit of a wireless mobile device charger in accordance with one embodiment.

FIG. 6 is a block diagram of selected portions of an electronic circuit 600 of a wireless mobile device charger such as the wireless mobile device charger 100 in FIG.

1-FIG. 4 in accordance with one embodiment. The circuit 600, and the wireless mobile device charger overall, wirelessly receives a power signal from an external source through an electronic powered receiver 605 including a receiver ("Rx") coil 606 and a wireless receiver 607. The battery charger 610 then uses the received power to charge the battery 615. When the battery 615 is charged, stored power may be transmitted via the battery charger 610 and a voltage converter 620 to the electronic power transmitter 625. The electronic power transmitter 625 includes a wireless transmitter 630 and a transmitter coil 635. The power is transmitted from the wireless mobile device charger through the electronic power transmitter 630.

Figure 7:
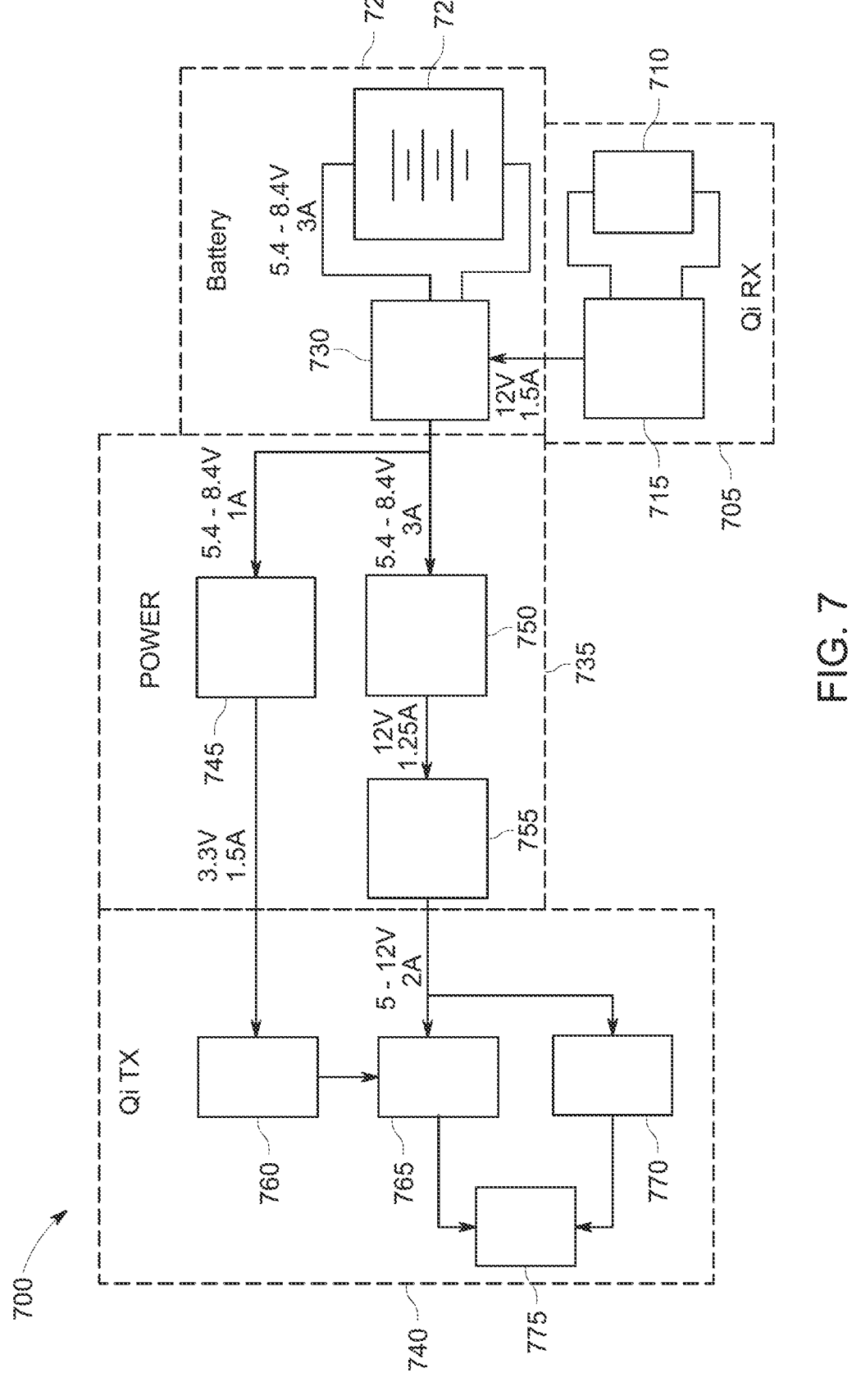
FIG. 7 is a block diagram of selected portions of an electronic circuit of a wireless mobile device charger in accordance with one embodiment.

FIG. 7 is a block diagram of selected portions of an electronics circuit 700 of a wireless mobile device charger such as the wireless mobile device charger 100 in FIG. 1-FIG. 4 in accordance with one embodiment. Actual parts numbers for one particular implementation are set forth in Table 1 below. The electronic circuit 700 receives a wireless power signal through an electronic power receiver 705 including a receiver coil 710 and a wireless receiver 715. The electronic circuit 700 also includes a power supply 720 that further includes a battery 725 and a battery controller 730. The battery 725 of the power supply 720 is charged by the power received through the electronic power receiver 705.

The electronics circuit 700 also includes a power conditioning unit 735 and an electronic power transmitter 740. The power conditioning unit 735 further includes a buck converter 745, a boost converter 750, and a buck converter 755. The electronic power transmitter 740 further includes a wireless transmission controller 760, a pair of half bridges 765, 770, and a transmission coil 775. The wireless transmission controller 760 receive power through the buck converter 745 and controls the operation of the half bridges 765, 770 through which the transmission coil 775 receives power that it then wireless transmits.

The electronics circuit 700 in FIG. 7 implements the Qi open interface standard for wireless power transfer. The electronic power receiver 705 and the electronic power transmitter 740 may therefore be referred to as a "Qi receiver" and a "Qi transmitter", respectively. However, any suitable wireless power transfer standard, protocol, or technique may be employed. It is therefore expressly contemplated that alternative embodiments may employ alternative standards, protocols, or techniques.

TABLE 1

| Parts Numbers | | |
|---|---|---|
| Dwg Ref. | Text Description | Part No. |
| 715 | Wireless Receiver | P9221-R |
| 730 | Battery Controller/Charger | BQ25792 |
| 745 | Buck Converter | LMR33640 |
| 750 | Boost Converter | TPS61089 |
| 755 | Buck Converter | MP2229GQ |
| 760 | Wireless Transmitter Controller | WCT1013VLH |

Figure 8:
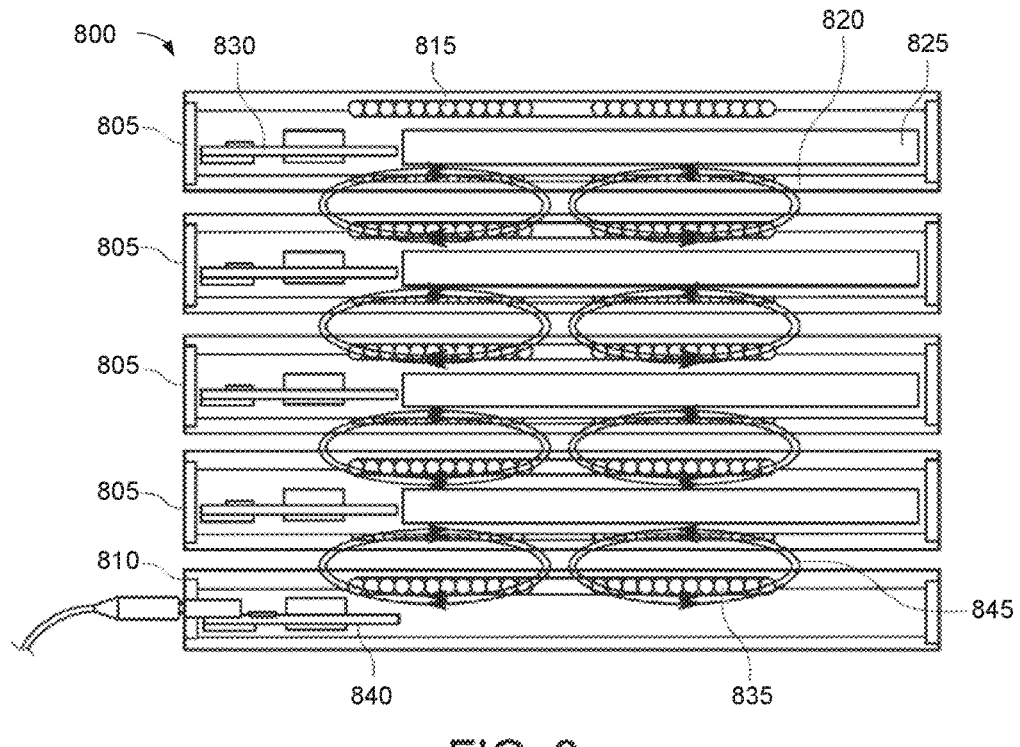
FIG. 8 depicts multiple wireless mobile device chargers stacked atop an electrical charging base to charge the wireless mobile device chargers.

FIG. 8 depicts an assembly 800 in which multiple wireless mobile device chargers 805 are stacked atop a charging base 810 to charge the wireless mobile device chargers 805. The illustration is largely conceptual, and so some details disclosed above are omitted. Such omissions are for the sake of clarity.

Each wireless mobile device charger 805 includes an electronics circuit such as the ones disclosed above relative to FIG. 6-FIG. 9. Consequently, each wireless mobile device charger 805 includes at least an electronic power transmitter 815, and electronic power transmitter 820, a battery 825, and a PCB 830 on which other electronic components are mounted. The electrical charging base 810, in this particular embodiment, receives power over a wired connection—e.g., through a wall charger and a Universal Serial Bus ("USB") connection. The electrical charging base 810 therefore includes only an electronic power transmitter 835 and a PCB 840, which may be implemented in the same manner as the electronic power transmitters 820 and PCBs 830 of the wireless mobile device chargers 805. The electronic power receivers 820 of the wireless mobile device chargers 805 is therefore omitted from the electrical charging base 810.

Although not shown in FIG. 8, the wireless mobile device chargers 805 may include various means for self-aligning during the stacking process. Returning briefly to FIG. 3, the magnets (not shown) may be disposed in the pockets 300, 315 of the top 110 and bottom 115 so that the wireless mobile device charger 100 may self-align during stacking through magnetic attraction. Other means may also be employed, such as more or fewer individual magnets, or a ring magnet (not shown) rather than individual magnets.

Still other means that do not operate on magnetic attraction may also be used. For example, the bottom of a wireless mobile device charger 805 may define a negative feature (.e.g., a groove, recess, or blind bore) that mates with a positive feature (e.g., a ride, button, or post) defined by the top of another wireless mobile device charger 805. These are all, by way of example and illustration, just some of the means for self-aligning the wireless mobile device chargers 805 during stacking. Those in the art having the benefit of this disclosure may appreciated still other means, including those having structures equivalent to those disclosed herein that perform the self-aligning function.

Returning now to FIG. 8, as described above, the assembly 800 comprises the electrically charging base 810 and a plurality of wireless mobile device chargers 805 stacked atop the electrical charging base 810. The bottom-most wireless device charger 805 is charged by the electrical charging base 110 and each succeeding wireless device charger 805 is charged by the wireless device charger 805 immediately below. The bottom-most wireless device charger 805 is wirelessly charged by the electrical charging base 810. In each instance, the wireless mobile device charger 805 is wirelessly charged through a wireless power signal 845. Note that, in some embodiments, a wireless mobile device charger 805 may be substituted for the electrical charging base 810. The electrical charging base in these embodiments may therefore be powered wirelessly rather than over a wired connection.

Furthermore, there theoretically is maximum number of wireless mobile device chargers 805 that may be charged in the manner shown in FIG. 8. Those in the art, however, will appreciate that there will be a practical maximum determined by considerations such stability of the stack and the power loss as power is transmitted through the stack that may be implementation specific. Accordingly, the number of wireless mobile device chargers 805 shown in FIG. 8 is illustrative only and may vary depending upon the embodiment.

Figure 9:
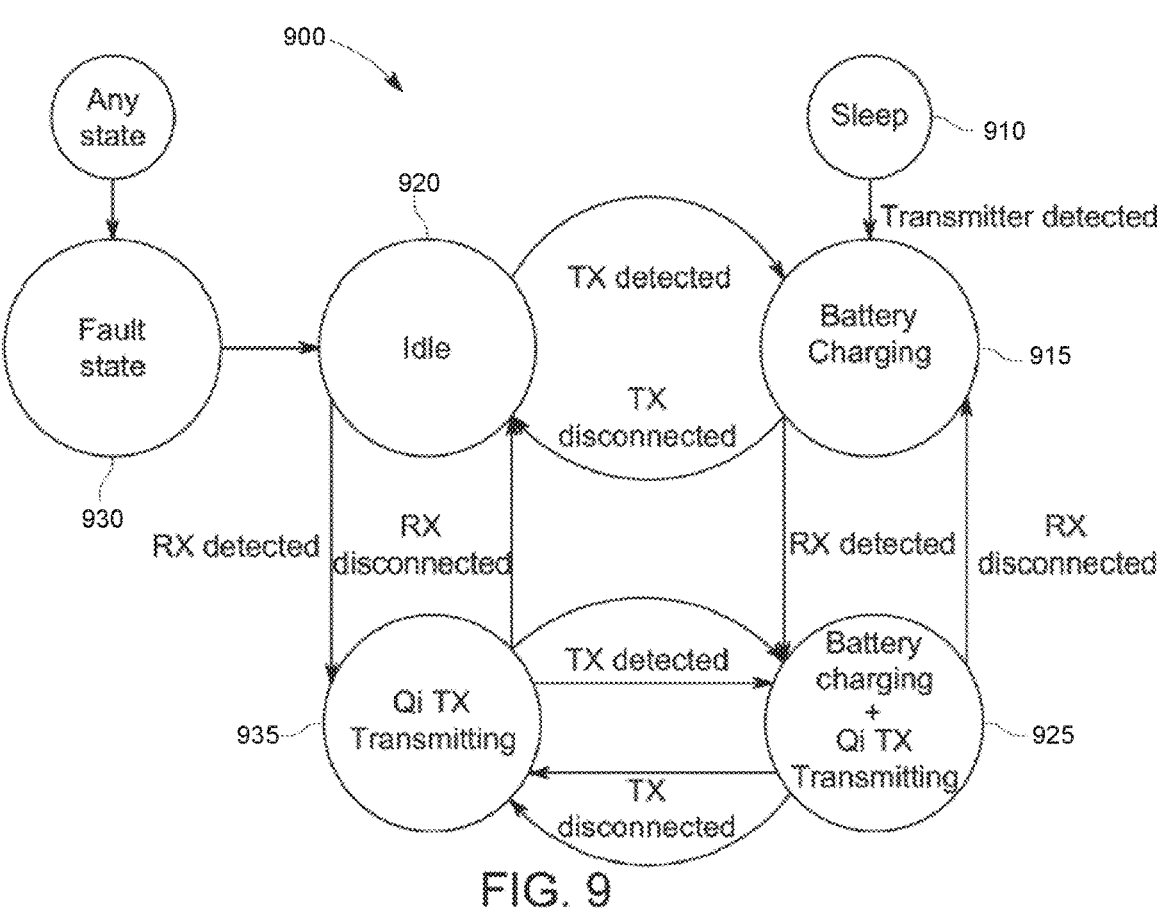
FIG. 9 is a state diagram for the operation of a single wireless mobile device charger.

FIG. 9 is a state diagram 900 of a state machine (not separately shown) for the operation of a single wireless mobile device charger such as the wireless mobile device chargers 805 of FIG. 8. The state machine includes a number of states including a sleep state 910 in which the wireless mobile device charger is hibernating and disabled; a battery charging state 915 in which the battery is charging; an idle state 920 in which the wireless mobile device charger idles from routine operations but is not hibernating or disabled; a battery charging and transmitting state 925 in which the battery charges and the wireless mobile device charger transmits power; a fault state 930 in which detected faults may be diagnosed and cleared; and a transmitting state 935 in which the wireless mobile device charger is transmitting power.

As discussed above, the state machine includes a sleep state 900 into which the wireless mobile device charger transitions when the battery charge is depleted and there is no wireless power transmitter from which to receive power or at the factory prior to shipment. Once in the sleep state 900, wireless power transmission is prevented. Thus, the sleep state in this particular embodiment may double as a shipping mode. When in the sleep state 910, the wireless mobile device charger remains in the sleep mode until an electronic power transmitter from an external source is detected. The external source may be another wireless mobile device charger or an electric charging base such as a wireless mobile device charger 825 and the electrical charging base 810, respectively, shown in FIG. 8. The state machine then transitions to a battery charging state 915.

In the battery charging state 915 from the sleep state 910, the battery is charged for an initial period of time. This period may be measured in elapsed time or the charged level of the battery. The goal is to ensure that the battery is sufficiently charged to conduct operations as described herein. Once the initial period has passed, the state machine then enters an idle state 920 or the battery charging and transmitting state 925 depending on whether an electronic power receiver is present to which power may be transmitted. Thus, the battery charging state 915 may be entered during initiation prior to beginning routine operations.

Once in routine operations, the state machine enters the battery charging state 915 from the idle state 920 if an external electronic power transmitter is detected and from the battery charging and transmitting state 925 if an external electronic power receiver is disconnected. The battery charging state 915 may transition to the idle state 920 if an external electronic power transmitter is disconnected, thereby preventing charging, and may enter the battery charging and transmitting state 925 if an external electronic power receiver is detected.

In general, in routine operations (i.e., not in the sleep or shipping state 910 or in the fault state 930), whenever there is no external electronic power transmitter to receive power from and no external electronic receiver to transmit power to, the state machine enters the idle state 920. If in the idle state 920 and an external electronic power transmitter is detected, the state machine transitions to the battery charging state 915. If in the idle state and an external electronic power transmitter is detected, the state machine enters the transmitting state 935.

The state machine only enters the transmitting state 935 if an external electronic power receiver has been detected. The transmitting state 935 may be entered from the battery charging and transmitting state 925 if a detected external electronic power transmitter is disconnected or from the idle state 920 if an external electronic power transmitter has been detected. When in the transmitting state 935, whenever an external electronic power receiver is disconnected, the state machine return to the idle state 920. If, while in the transmitting state 935, an external electronic power transmitter is detected, the state machine transitions to the battery charging and transmitting state 925.

The state machine may enter the battery charging and transmitting state 925 whenever both an external electronic power transmitter and an external electronic power receiver are detected. Note that, in this particular embodiment, there is no transition from a state in which there is no detected external electronic power receiver and no detected external electronic power transmitter (e.g., the idle state 920) to a state in which there is both a detected external electronic power receiver and a detected external electronic power transmitter (e.g., the battery charging and transmitting state 925). In this particular embodiment, if an external electronic power transmitter and an external electronic power receiver are presented at the same time, they will be detected sequentially in no particular order.

Thus, the state machine does not transition between the idle state 920 and the battery charging and transmitting state 925. The battery charging and transmitting state 925 is entered from the battery charging state 915 when an external electronic power receiver is detected and from the transmitting state 935 when an external electronic power transmitter is detected. Conversely, when in the battery charging and transmitting state 925, the state machine transitions to the battery charging 915 if the external electronic power receiver is disconnected or to the transmitting state 935 if the external electronic power transmitter is disconnected.

As noted above, the state machine includes a fault state 930. Any time a fault is detected regardless of which state the state machine is currently in, the state machine will transition to the fault state 930. Among the faults that may be detected are, without limitation, over temperature, under temperature, battery undervoltage, battery overvoltage, battery over current, power regulator fault, short current fault, wireless transmission faults, and wireless reception faults. Still other kinds of faults may be encountered in addition to, or in lieu of, those listed.

Note that the state machine represented in the state diagram 900 of FIG. 9 is but one possible implementation. Other embodiments may use other state machines.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A wireless mobile device charger, comprising:
   a housing, the housing omitting any electronic ports or electrical contact;
   a rechargeable battery disposed within the housing;
   an electronic power receiver disposed within the housing, the power receiver wirelessly powered by an external power source using a wireless power transfer standard and through which the battery is wirelessly charged; and
   an electronic power transmitter disposed within the housing, the power transmitter powered by the battery to wirelessly transmit electrical power using the wireless power transfer standard.

2. The wireless mobile device charger of claim 1, wherein the external source is a second wireless mobile device charger comprising:

a second housing, the second housing omitting any elec-
tronic ports or electrical contact;

a second rechargeable battery disposed within the second
housing;

a second electronic power receiver disposed within the
second housing, the second power receiver wirelessly
powered by a second external power source using the
wireless power transfer standard and through which the
second battery is wirelessly charged; and a second electronic power transmitter disposed within the
second housing, the second power transmitter powered
by the second battery to wirelessly transmit electrical
power using the wireless power transfer standard.

3. The wireless mobile device charger of claim 1,
wherein:

the housing includes a top and a bottom, the top and the
bottom defining a top face and a bottom face, respec-
tively;

the power transmitter is disposed proximate the top to
wirelessly transmit power through the top face; and the power receiver is disposed proximate the bottom to
wirelessly receive power through the bottom face.

4. The wireless mobile device charger of claim 3,
wherein:

the top surface defines a plurality negative features;

the bottom surface defines a plurality of positive features;
and the negative features and the positive features are comple-
mentary.

5. The wireless mobile device charger of claim 1,
wherein:

the housing defines a first side and a second side, the first
side and the second side defining a first face and a
second face, respectively;

the first surface defines a plurality negative features;

the second surface defines a plurality of positive features;
and the negative features and the positive features are comple-
mentary.

6. The wireless mobile device charger of claim 1, further
comprising means for aligning the wireless mobile device
charger with a second wireless mobile device charger.

7. The wireless mobile device charger of claim 6, wherein
the means for aligning is disposed within the housing or is
formed on one or more outer surfaces of the housing.

8. The wireless mobile device charger of claim 6,
wherein:

the housing defines a first side and a second side, the first
side and the second side defining a first face and a
second face, respectively; and the means for aligning includes:

a plurality negative features defined in the first surface;
and a plurality of positive features defined in the second
surface, the negative features and the positive fea-
tures being complementary.

9. The wireless mobile device charger of claim 6, wherein
the housing defines a first side and a second side, the first
side and the second side defining a first face and a
second face, respectively; and the means for aligning includes:

at least one first magnet of a first polarity disposed
within the housing and proximate the first side; and at least one second magnet of a second polarity dis-
posed within the housing and proximate the second
side, the first polarity and the second polarity being
magnetically attractive to one another.

10. The wireless mobile device charger of claim 1,
wherein:

the housing defines a first side and a second side, the
first side and the second side defining a first face and
a second face, respectively; and further comprising:

at least one first magnet of a first polarity disposed
within the housing and proximate the first side; and at least one second magnet of a second polarity dis-
posed within the housing and proximate the second
side, the first polarity and the second polarity being
magnetically attractive to one another.

11. An assembly, comprising:

an electrical charging base; and a plurality of wireless mobile device chargers stacked
atop the electrical charging base, wherein:

the bottom-most wireless device charger is wirelessly
charged by the electrical charging base using a
wireless power transfer standard; and each succeeding wireless device charger is wirelessly
charged by the wireless device charger immediately
below using the wireless power transfer standard.

12. The assembly of claim 11, wherein the electrical
charging base is a wireless electrical charging base.

13. The assembly of claim 11, wherein at least one of the
wireless mobile device chargers comprises:

a housing, the housing omitting any electronic ports or
electrical contact;

a rechargeable battery disposed within the housing;

an electronic power receiver disposed within the housing,
the power receiver wirelessly powered by an external
power source using a wireless power transfer standard
and through which the battery is wirelessly charged;
and an electronic power transmitter disposed within the hous-
ing, the power transmitter powered by the battery to
wirelessly transmit electrical power using the wireless
power transfer standard.

14. The assembly of claim 13, wherein the external source
is a second wireless mobile device charger comprising:

a second housing, the second housing omitting any elec-
tronic ports or electrical contact;

a second rechargeable battery disposed within the second
housing;

a second electronic power receiver disposed within the
second housing, the second power receiver wirelessly
powered by a second external power source using the
wireless power transfer standard and through which the
second battery is wirelessly charged using the wireless
power transfer standard; and a second electronic power transmitter disposed within the
second housing, the second power transmitter powered
by the second battery to wirelessly transmit electrical
power.

15. The assembly of claim 13, wherein:

the housing includes a top and a bottom, the top and the
bottom defining a top face and a bottom face, respec-
tively;

the power transmitter is disposed proximate the top to
wirelessly transmit power through the top face; and the power receiver is disposed proximate the bottom to
wirelessly receive power through the bottom face.

16. The assembly of claim 15, wherein:

the top surface defines a plurality negative features;

the bottom surface defines a plurality of positive features;
and the negative features and the positive features are complementary.

17. The assembly of claim 13, wherein:

the housing defines a first side and a second side, the first side and the second side defining a first face and a second face, respectively;

the first surface defines a plurality negative features;

the second surface defines a plurality of positive features; and the negative features and the positive features are complementary.

18. The assembly of claim 13, further comprising means for aligning the wireless mobile device charger with a second wireless mobile device charger.

19. The assembly of claim 18, wherein the means for aligning is disposed within the housing or is formed on one or more outer surfaces of the housing.

20. The assembly of claim 18, wherein the housing defines a first side and a second side, the first side and the second side defining a first face and a second face, respectively; and the means for aligning includes:

a plurality negative features defined in the first surface;

a plurality of positive features defined in the second surface, the negative features and the positive features being complementary.

21. The assembly of claim 18, wherein the housing defines a first side and a second side, the first side and the second side defining a first face and a second face, respectively; and the means for aligning includes:

at least one first magnet of a first polarity disposed within the housing and proximate the first side; and at least one second magnet of a second polarity disposed within the housing and proximate the second side, the first polarity and the second polarity being magnetically attractive to one another.

22. The assembly of claim 13, wherein:

the housing defines a first side and a second side, the first side and the second side defining a first face and a second face, respectively; and further comprising:

at least one first magnet of a first polarity disposed within the housing and proximate the first side; and at least one second magnet of a second polarity disposed within the housing and proximate the second side, the first polarity and the second polarity being magnetically attractive to one another.

23. A wireless mobile device charger, comprising:

a housing defining a top and a bottom thereof;

a plurality of alignment magnets disposed in the housing on the top and bottom to align the wireless mobile device charger with a second wireless mobile device charger stacked above and with a third wireless mobile stacked below;

power receiver wirelessly powered by an external power source using a wireless power transfer standard; and an electronic power transmitter capable of wirelessly transmitting electrical power using the wireless power transfer standard.

24. The wireless mobile device charger of claim 23, wherein the alignment magnets self-align wireless the mobile device charger with the second wireless mobile device charger and the third mobile device charger.

* * * * *